…

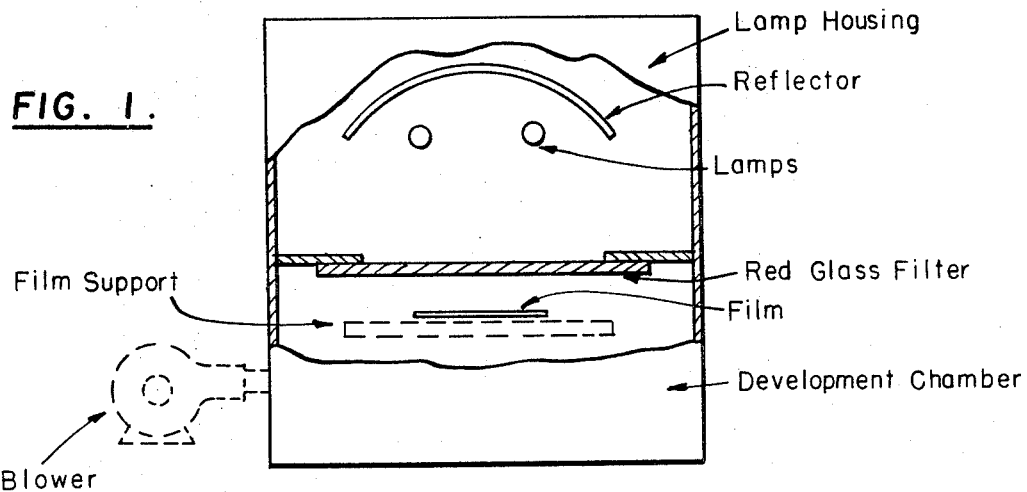
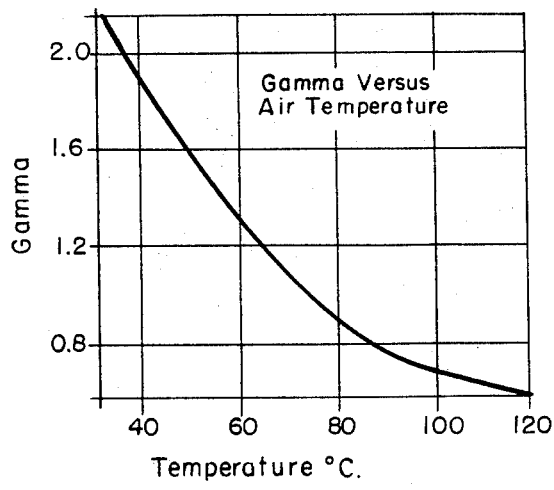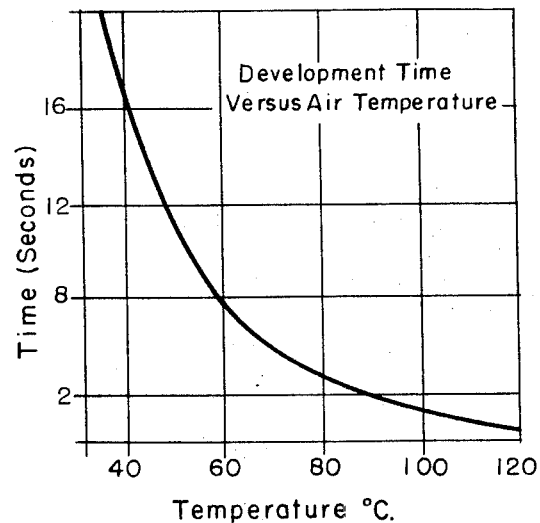
INVENTORS
Richard A. Fotland
Frederick N. Robertson
James M. Lewis

United States Patent Office 3,573,046
Patented Mar. 30, 1971

3,573,046
HEAT TREATMENT PROCESS TO CONTROL CONTRAST IN NONSILVER LIGHT SENSITIVE SYSTEMS
Richard A. Fotland, Lyndhurst, and Frederick N. Robertson and James M. Lewis, Cleveland, Ohio, assignors to Horizons Incorporated, a division of Horizons Research Incorporated
Filed May 1, 1968, Ser. No. 725,885
Int. Cl. G03c 5/24
U.S. Cl. 96—48
11 Claims

ABSTRACT OF THE DISCLOSURE

The control of contrast and/or gamma of a nonsilver photosensitive film by controlling the temperature of the film during optical development of the same.

---

The invention herein described was made in the course of or under a contract or subcontract thereunder, with the Systems Engineering Group, Air Force Systems Command.

This invention relates to a process of optical intensification of faint or latent images in organic photosensitive films, such as that described in copending U.S. patent application Ser. No. 552,414, filed May 24, 1966, and now issued as U.S. Pat. 3,510,300, the disclosure of which is incorporated herein by reference. More particularly, it relates to procedures whereby the contrast and/or gamma renditions in a processed film may be controlled by employing suitable techniques during the optical development step.

For certain purposes it has been found that in order to provide the most effective viewing conditions of a pictorial rendition, it is desirable that the tonal scale extend over a range of 1.0 to 1.5 optical density units. In many instances the scene which forms the image or the spatially modulated printing light intensities may extend over either a very narrow or very broad range and this usually determines the contrast available in the printed image.

In order to obtain a contrast within the range indicated above, it is desirable to have available a light sensitive imaging media whose contrast may be varied at will over broad limits so that either contrast compression is available, when the exposing image intensity range is very broad, or contrast expansion may be employed when the range of exposing light intensities in any image covers only a narrow range.

The present invention provides a technique whereby it is possible to vary both the contrast and the gamma of organic photosensitive films which are capable of being optically developed. A copending application, now U.S. Pat. 3,510,300, describes the optical development process in detail and indicates that it is applicable to any of the nonsilver compositions described in the following U.S. patents: 3,042,515, 3,042,516, 3,042,517, 3,042,518, 3,042,519, 3,046,125, 3,056,673, 3,095,303, 3,100,703, 3,102,029, 3,102,810, 3,106,466, 3,109,736, 3,112,200, 3,113,024, 3,121,633, 3,147,117, 3,285,744, 3,272,635, 3,284,407, 3,342,595, 3,342,602, 3,342,603, 3,342,604; and others, still pending.

In the drawings accompanying this application
FIG. 1 shows an apparatus for optical development; and
FIGS. 2 and 3 are graphical results of the practice of the invention.

The example below describes one specific film formulation and how the gamma of the processed film can be varied, but it is to be understood that the concepts described are applicable to many other film formulations.

EXAMPLE 1

A photosensitive composition was prepared by adding the components listed below to 50 cc. of a solution of polycarbonate resin having a concentration equal to 100 grams of resin per 672 grams of dichloromethane.

|  | Gm. |
|---|---|
| 1,1-bis-(p-dimethylaminophenyl)ethylene | 2.5 |
| p-Dimethylaminobenzaldehyde anil | 0.025 |
| 2,6-di-tert-butyl-p-cresol | 0.625 |
| Triphenylstibine | 0.125 |
| Tris(p-aminophenyl) methane | 0.063 |
| Iodoform | 2.5 |

The solids were added to the polymer solution in the order listed and were thoroughly dissolved in the polymer solution, by stirring, as necessary. The resultant solution was coated on a 5 mil polyester film base using a Bird applicator bar to provide a wet coating thickness of 1½ mils. The film of photosensitive composition was allowed to dry for several hours and then photographically exposed on an Eastman Model 101 process sensitometer. The coating procedure is fully described in Photographic Science and Engineering, vol. 8, No. 2, pp. 95–105 and vol. 5, p. 98. No visible image was observed after exposure. The optical development was carried out by exposing this film, containing a latent image, to a blanket exposure from an intense red light source.

The optical development apparatus used in this example is shown in FIG. 1. The red light source consisted of two 8 inch long, 1.5 kw., tungsten-iodine lamps spaced parallel and a distance of 2 inches apart. These lamps are contained in a metal air-cooled box having a window 6 inches square over which is placed a Corning glass filter (C.S. No. 2–60, Type 2408) which removes unwanted illumination from the optical development area. The lamp-to-film distance was 4 inches. Means were provided for maintaining a preselected air temperature and rate of air flow at the film development plane.

The rate of air flow in the optical development unit shown in FIG. 1 was adjusted so that the air velocity over the surface of the film was 600 linear ft./min. Air velocities from about 100 linear feet/min. to about 1500 linear feet/min. may be used. A series of exposed steptablets were optically developed for several different time intervals and at several different temperatures. During optical development, the films were supported by their edges in the moving air stream. The development was carried out until the first trace of fog appeared in nonimage areas. In the results reported below, the expression "development time" is defined as the time interval until the first trace of fog appeared in nonimage areas.

It was observed that as the development was carried out at higher air temperatures, the development rate increased and thus the development time decreased. After optical development, film strips were removed from the optical development apparatus and placed in a moving stream of air heated to 140° C. for a period of 1 minute, this serving to fix the films. FIGS. 2 and 3 are graphs showing the processed film gamma and the development time respectively as a function of air temperature during optical development. It can be seen from these graphs that the gamma can be made to range from a high of 2.3 to a low of 0.6 by selection of a specific air temperature and development time.

In the preceding example, the film being optically developed was supported on the edges so that both sides of the film were in contact with the moving air stream. If a film was developed at a relatively low temperature, for example 40° C., a high gamma could be obtained either with film supported by its edges in the air stream or with the uncoated side of the film base supported on and in intimate contact with a low thermal conductivity substrate such as glass or ceramic.

The relationship between gamma, development time, and substrate temperature under each of these conditions is shown in FIGS. 2 and 3.

If, during low temperature development, the film was supported on a high thermal conductivity support, such as aluminum or steel, it was found that the resultant gamma was always equal to 1.0 for the temperature range of 25 to 70° C. When a solid surface was positioned against the uncoated side of the film being developed, the substrate was placed in the development unit prior to the introduction of the film for a sufficient time so that the substrate temperature could reach equilibrium with the air temperature. By varying the film substrate conductivity, it is possible (when developing at low temperatures) to obtain a selected film gamma between the range of 1.0 and 2.3. Furthermore, a gamma selection may also be achieved by developing at a low temperature in air; thus, realizing a high gamma; and for selected areas of the film in which a gamma of 1.0 is desired, placing the film being developed in contact with a thermally conducting substrate.

A low temperature gamma may be reduced from a value of 2.3 at 25° C. to a value in the region of 1.0 to 1.2 merely by increasing the air velocity over the film. Changes in gamma with air velocity occur rapidly as the air velocity is increased over 1,000 ft./min. At 1500 ft./min., a film gamma at 25° C. of 1.1 is obtained.

Preheating of exposed film, prior to optical development, for short periods of time at temperatures in the region of 80 to 100° C. is effective in reducing gamma in the medium and low gamma regions. Thus, a film gamma of 1.0 obtained for development temperatures near 70° C. may be reduced to the region of 0.6 to 0.7 by preheating the film in air for 30 seconds at a temperature of 80° C. prior to optical development. Preheating does not change the gamma obtained for low temperature development but does reduce the subsequent development rate at these low temperatures.

The previously described results were obtained with a developing film plane-lamp distance of 4 inches. The energy density at the film plane was measured by placing a Kimble KG–1 heat absorbing glass filter over a thermopile radiometer. It was found that, under this condition, the energy density was 120 mw./cm.$^2$. Experiments were carried out in which the film plane lamp distance was increased so that the energy density was reduced to 40 mw./cm.$_2$, a 4 times reduction in energy. It was found that, under these conditions, a gamma of 1.7 was obtained at all temperatures from 25° C. to 120° C. Film may be developed, for example, at a temperature of 100° C. under the high intensity condition to realize low gamma. High gamma may then be obtained by merely reducing the light intensity. It is found, however, that with a fourfold reduction in light intensity, the development time is increased by a factor of 6.0 to 7.0, indicating a reciprocity failure in the development operation.

It has been found that the image density may be increased with a resulting increase in gamma by thermally fixing at times and temperatures in excess of those required to effect the removal of the activator from the photosensitive film. A series of films were processed to obtain a gamma of 2.0 under "normal' fixing conditions, i.e. 145° C. for 1 minute. If the fixing time was extended to 5 minutes at 145° C., the contrast increased to provide a gamma of 2.3. If, on the other hand, films were fixed for 1 minute at a temperature of 170° C., the gamma increased to a value of 3.0. Five minutes fixing at 170° C. provided a film gamma of 4.3. Similar increases in gamma were observed for films processed so as to have a lower gamma under normal fixing conditions.

EXAMPLE 2

Films were prepared in the manner described in Example 1, but employing the following formulation:

Leuco opal blue—50 mg.
2,6-di-tert-butyl-p-cresol—25 mg.
Triphenylstibine—10 mg.
Iodoform—200 mg.
10% polystyrene in benzene—3 cc.
Acetone—1 cc.

The gamma of film formulated with the above listed composition was found to vary with development temperature. In this particular formulation, however, higher temperature development resulted in the formation of a higher gamma rather than a lower gamma as with the formulation in Example 1. Thus, for room temperature development, a gamma of 1.0 was obtained with a development time of 20 seconds. At an air temperature of 120° C., the development time was reduced to 3 seconds while the film gamma increased to a value of 3.0. The high gamma could be reduced to a value of 1.0 for high temperature development by either directing a high velocity air stream over the film or by developing the film on a thermally conducting substrate as in Example 1.

The above examples illustrate the achieving of gamma and/or contrast control in two entirely different photosensitive compositions capable of being optically developed, and these are intended to illustrate the applicability of this invention to optically developable compositions, in general.

While not wishing to be bound by any theoretical explanation, it is believed that, in the present invention, gammas in excess of 1.0 are obtained under conditions in which differential heating of image areas during optical development occurs. In dense areas, the absorption of incident radiation is higher than in background or low density areas. Hence, the high density areas rise in temperature much more rapidly than the low density areas. In the case of the formulation in Example 1, the development rate increases rapidly as the temperature of the area being developed rises. Thus, dense areas are developed at a more rapid rate than background or low density areas, leading to a condition of high gamma. This differential heating is substantiated by the fact that means which prevent this effect from occurring, such as directing a high velocity air stream over the film or developing upon a thermally conducting substrate, serve to prevent the realization of a high gamma. The phenomenon responsible for generating low gamma is not known at this time.

In the formulation listed in Example 2, the development rate rises only slowly with increasing temperature up to a development temperature of 90° C. Beyond 90° C., the development rate increases very rapidly with increasing temperature. Thus, it is to be expected that, in this formulation, higher gammas are obtained at higher development air temperatures.

In the preceding description, the radiation for optical development must be selected so as to avoid fogging of the nonimage areas, and will depend to some extent on the specific constituents in the photosensitive composition. With compositions of the type described, radiation between about 600 and 900 millimicrons, i.e. from the near I.R. region through the orange/red region, has been used. The intensity of the radiation utilized for optical development has been varied between 20 milliwatts/sq. cm. and 5 watts/sq. cm.

The term "contrast" is used to represent the spread of densities in the film and the term "gamma" is used to mean the slope of the H and D curve (density vs. Log Exposure).

Broadly stated, the invention resides in modifying the heat transfer to or from a nonsilver photosensitive composition during development of a visible image from a latent image in said composition, whereby the contrast and the gamma of the composition can be altered to fit desired requirements on the part of a photointerpreter.

When the composition is a film which is developed while supported on a solid substrate, the substrate may have a heat conductivity between about 3 and about 5000 calories/cm./sec./° C.

We claim:
1. In a process for intensifying dye containing images present in nonsilver free radical photosensitive film as a result of exposure of said film to a pattern of image producing radiation, wherein said image containing film is further exposed to a dose of radiation in the near infrared and infrared in sufficient amount to intensify said images and to thereby render the same more clearly visible; the improvement which comprises:

maintaining said film within a desired range of temperatures during said image intensifying exposure and exposing said film to said image intensifying radiation for an interval related to said temperatures.

2. Process of claim 1 wherein the temperature of said film is maintained within a range of temperatures between 30° C. and 120° C. by blowing a gas past the surface of said film while it is being exposed for image intensification, said gas serving as a heat transfer means to transfer heat to or from said film during said exposure without adversely affecting said film.

3. Process of claim 1 wherein the temperature of said film is maintained within a range of temperatures between 30° C. and 120° C. by supporting said film on a solid support whereby said support serves as a heat transfer means to transfer heat to or from said film during said exposure.

4. Process of claim 1 wherein the photosensitive film includes at least one organic halogen compound in which a single carbon atom is attached to three halogen atoms and at least one compound which forms a visible reaction product with a photolytically produced fragment of said organic halogen compound.

5. Process of claim 4 in which the organic halogen compound is represented by the general formula $$A-C-X_3$$

wherein A is a monovalent radical selected from the group consisting of H-, Cl-, Br-, I, alkyl, aryl, aroyl, and halogen substituted alkyl; and each X is a halogen atom selected from the group consisting of Cl, Br and I.

6. The process of claim 1 wherein the radiation used for development of a visible image lies in the range between about 600 m$\mu$ and 900 m$\mu$.

7. The process of claim 1 wherein the gas velocity over the surface of the film is between about 100 and 1,500 feet/min.

8. The process of claim 1 wherein the film is preheated before it is developed.

9. The process of claim 1 wherein the gamma of the film is altered to a desired value by varying the fixing time and temperature.

10. The process of claim 1 wherein the film comprises the following composition:

| | Gm. |
|---|---|
| 1,1-bis-(p-dimethylaminophenyl)ethylene | 2.5 |
| 2,6-di-tert-butyl-p-cresol | 0.625 |
| Triphenylstibine | 0.125 |
| p-Dimethylaminobenzaldehyde anil | 0.025 |
| Tris(p-aminophenyl) methane | 0.063 |
| Iodoform | 2.5 | in a polycarbonate resin binder.

11. The process of claim 3 wherein said support has a heat conductivity between 3 and about 5000 calories/cm./sec./° C.

References Cited
UNITED STATES PATENTS

| 3,042,519 | 7/1962 | Wainer | 96—90 |
| 3,056,673 | 10/1962 | Wainer | 96—48 |

NORMAN G. TORCHIN, Primary Examiner

R. E. FICHTER, Assistant Examiner